UNITED STATES PATENT OFFICE.

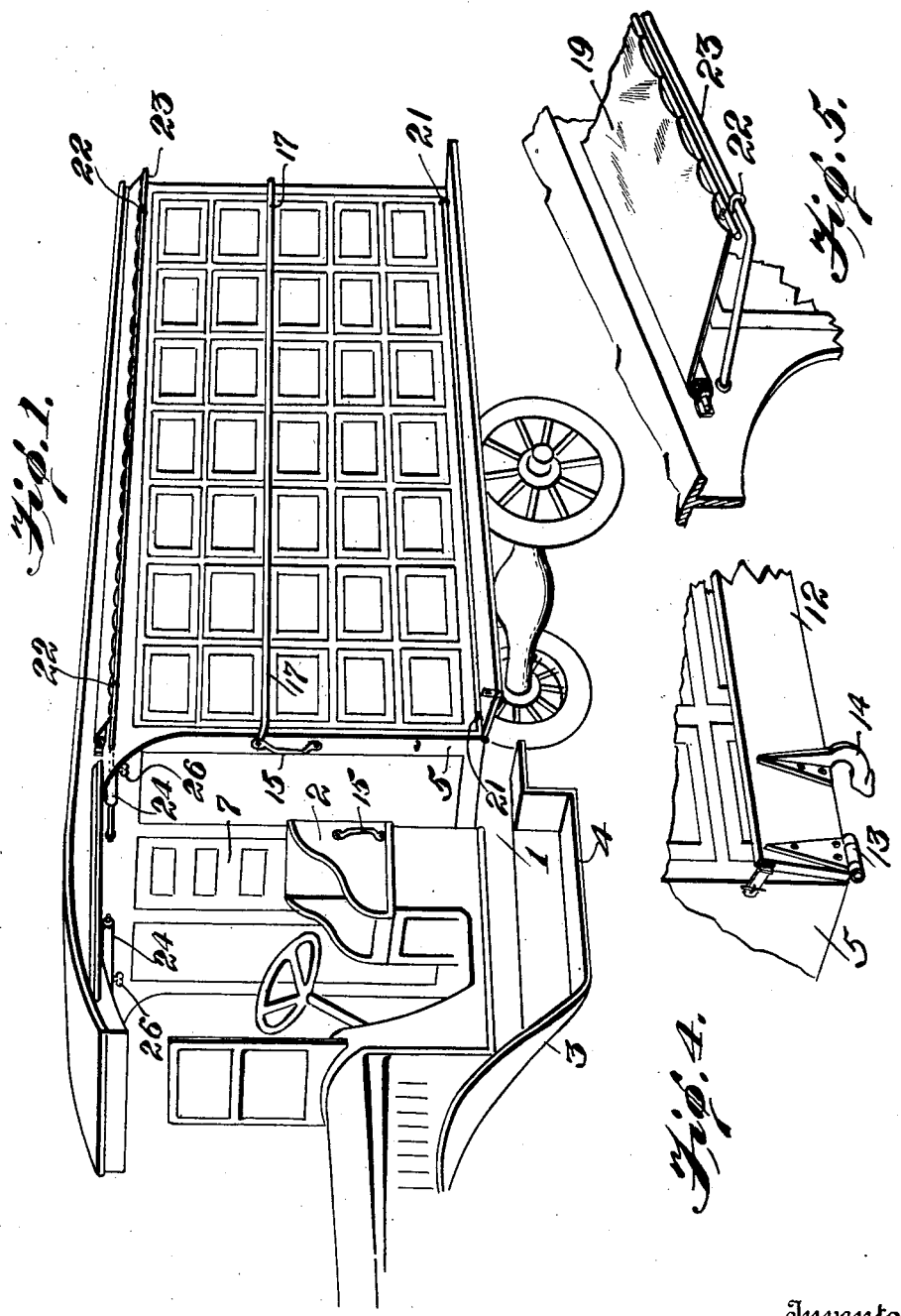

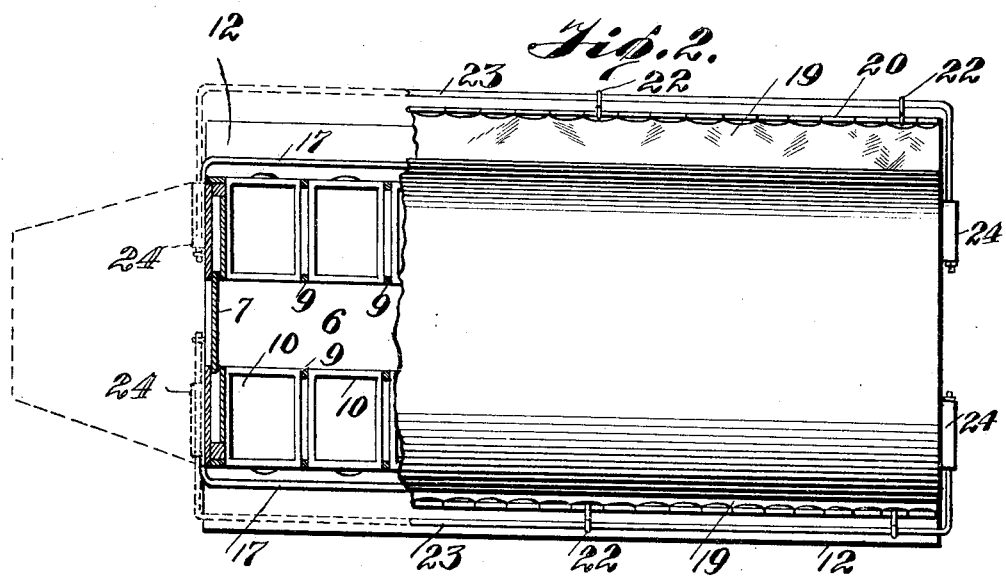
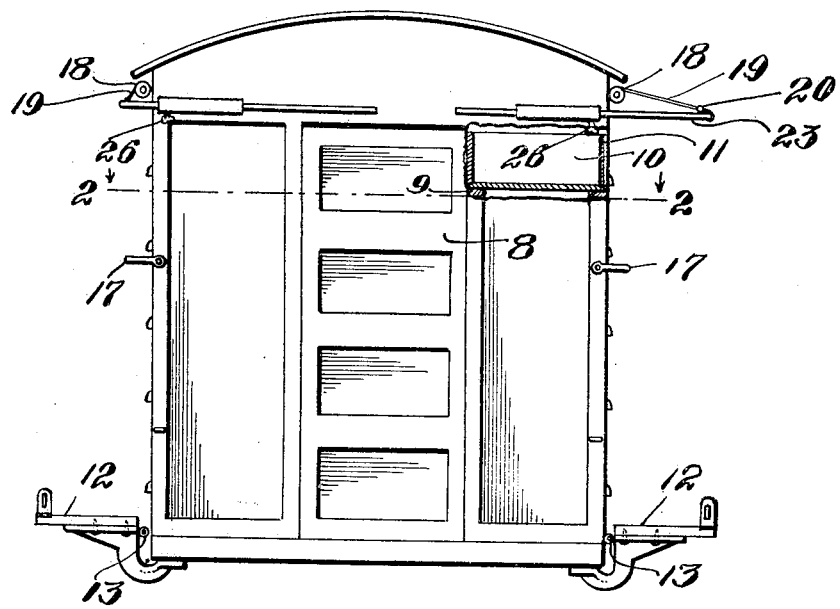

WILLIAM HENRY FRUITTICHER, OF BIRMINGHAM, ALABAMA, ASSIGNOR OF ONE-THIRD TO EDWIN W. FRUITTICHER AND ONE-THIRD TO MITCHELL E. DAVIS, BOTH OF BIRMINGHAM, ALABAMA.

GROCERY SALES-WAGON.

1,371,234.     Specification of Letters Patent.     Patented Mar. 15, 1921.

Application filed September 6, 1918. Serial No. 252,950.

*To all whom it may concern:*

Be it known that I, WILLIAM H. FRUITTICHER, a citizen of the United States of America, residing at Birmingham, in the county of Jefferson and State of Alabama, have invented certain new and useful Improvements in Grocery Sales-Wagons, of which the following is a specification.

My invention relates to a grocery sales wagon which will be, in effect, a portable grocery store.

My invention is especially adapted for embodiment in an automobile truck body but with suitable modification as to size and weight it may be adapted to be drawn by horse if desired.

The chief object of my invention is to arrange for the convenient display, inspection and sale of groceries and wares, and for carrying them in such quantities as to meet the ordinary daily demands of the trade, suitable provision being made for carrying a reserve stock for replenishment.

A further object is to adapt the body for the most convenient handling and display of merchandise while protected in suitable containers, and to this end the body is provided with a folding counter above which are tiers of drawers with glass fronts which can be drawn out at the side of the body and rested on the shelf while the merchandise is being selected and sold to the customer.

A further object of my invention is to equip the body with side protecting awnings or curtains to cover the display drawers so as to protect them from the weather when necessary.

My invention further embodies various other novel details of construction and arrangements of parts which are hereinafter more particularly described and pointed out in the appended claims, reference being had to the accompanying drawings which form a part of this specification, and in which:—

Figure 1 shows in perspective view my invention in a truck body design.

Fig. 2 is a partial section and partial plan view taken on the line 2—2 of Fig. 3.

Fig. 3 is a rear end elevation of the body partly broken away.

Fig. 4 is a partial detail view of a part of the folding shelf counter.

Fig. 5 is a partial detail view of the curtain mounted as an awning.

Similar reference numerals refer to similar parts throughout the drawings.

I have illustrated my invention in the form of a body mounted upon a truck chassis 1 having a front driver's seat 2 near one side of the chassis and front mud guards 3 attached to the chassis and provided at their rear ends with a step 4 adjacent to the front end of the body 5. The body is made substantially wider than the chassis and preferably overhangs the same to an extent corresponding to the width of the mud guards which are omitted under the truck body as the latter will serve in lieu thereof.

The body proper is provided with a central passage-way 6 extending from front to rear and to which access is had through a front sliding door 7 disposed on one side of the seat 2 and a rear sliding door 8. This passage-way is flanked on each side with a suitable frame work 9 built into the body and adapted to support a number of horizontal rows of drawers 10 which in their outside end faces are provided with glass panels 11 for the display of the wares therein. These drawers and their supporting frame work form the sides of the body, each drawer being provided with a handle by which it may be drawn from its supporting ways. A running board or shelf 12 is hinged at 13 to the bottom side edges of the body below the drawers and is provided with inwardly extending stops 14 which will engage the bottom of the body and arrest the shelf after it has swung to horizontal position. These shelves can be raised to cover the lower tiers of drawers on each side when the wagon is moving and can be folded down into horizontal position to receive and support the drawers for displaying the wares when the wagon stops for a customer. These shelves are also made strong enough to support the weight of the driver so that they form running boards that he can walk along so as to conveniently reach the upper tier of drawers. The steps 4 are especially provided on each side to enable the driver or customer to mount the running boards and suitable handles 15 are provided for convenience in mounting the running boards, and in addition thereto a pipe 17 forming the hand rail is attached to each side of the body and disposed between the second and third tier of drawers from the top.

On each side of the body at its top I mount a spring curtain roller 18 on which is rolled a side curtain 19 which is co-extensive in width with the side of the body and is long enough to be drawn down over and to cover the drawers on each side. In the bottom end of the curtain is mounted a rod 20, the ends of which are adapted to be engaged by catches 21 so as to hold the curtain in its lowered position. On this rod 20 near each end is swung a hook 22 which is adapted to be engaged by an awning frame 23 formed by a bent metal pipe or rod, the ends of which are bent into parallelism at right angles to the longitudinal member of the frame and are slidingly received in guides 24 mounted in the top panels at the front and back of the body. The forward ends of these guides at each end of the body are provided with a thumb screw 26 to hold the awning frame in the position in which it is desired to be held. When not in use the awning frames are pushed in against the body and clamped in this position by the set screws. When in use the awning frames are run out horizontally the desired distance from the sides of the body and the hooks 22 on the curtain rods are caught over them so that the latter are drawn out like awnings to protect the driver and customer from sun or rain while the inspection and selection of merchandise is being made. The side members of the awning frames are preferably greater in length than half the width of the body and it is desirable to set the awning frame on one side slightly above the other so that the adjacent ends of the frames when in retracted position will miss each other.

All varieties of merchandise can be stored and displayed through the drawer windows or equivalent containers, giving the customer the opportunity of seeing the entire display and of inspecting it sufficiently to reduce to a minimum the amount of service required from the driver. The passageway between the side tiers of drawers is utilized for a reserve storage space and for carrying such large articles as cannot be conveniently placed in the drawers or containers, such as brooms and large packages of groceries, such as sacks of flour, meal and the like.

In operation, the drawers of the body are stocked and the portable store thus provided is driven through the streets in a prescribed route and the customers supplied at their doors with a minimum expense and a maximum of convenience.

This invention is not intended to be restricted in scope to the specific embodiments shown, but contemplates such modifications as come within the spirit and scope of the claims.

What I claim as new and desire to secure by Letters Patent, is:—

1. In a vehicle of the character described, a body having its sides formed by closely associated tiers of laterally removable drawers and a supporting frame therefor, the drawers having glazed outer ends, and a shelf along the bottom portion of each side of the body.

2. In a vehicle of the character described, a body having its sides formed entirely by tiers of laterally removable drawers and light skeleton supporting frames forming guides therefor, the exposed ends of said drawers being glazed, and a hinged shelf forming a run-way along the bottom portion of each side of the body and adapted to fold toward the body when not in service.

3. In a vehicle of the character described, a body having its sides formed of laterally removable drawers and a skeleton supporting frame forming guides therefor, a top curtain for each side mounted on a spring roll and adapted to be drawn over and protect the exposed ends of the drawers, and laterally extensible frames mounted in the supporting frame and adapted to detachably engage the curtain ends and hold them in overhung position from the body top to form awnings.

4. In a vehicle of the character described, a body having its sides composed wholly of closely associated tiers of laterally removable drawers having glazed outer ends to display the wares therein, narrow intervening guides for the drawers, and covers adapted to protect the exposed ends of the drawers from the weather.

In testimony whereof I affix my signature.

WILLIAM HENRY FRUITTICHER.

Witness:
NOMIE WELSH.